United States Patent
He et al.

(10) Patent No.: US 11,782,765 B2
(45) Date of Patent: Oct. 10, 2023

(54) METHOD, DEVICE, AND PROGRAM PRODUCT FOR MANAGING COMPUTING SYSTEM

(71) Applicant: EMC IP Holding Company LLC, Hopkinton, MA (US)

(72) Inventors: Bin He, Shanghai (CN); Zhen Jia, Shanghai (CN); Danqing Sha, Shanghai (CN); Anzhou Hou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 305 days.

(21) Appl. No.: 17/384,041

(22) Filed: Jul. 23, 2021

(65) Prior Publication Data

US 2022/0413912 A1 Dec. 29, 2022

(30) Foreign Application Priority Data

Jun. 28, 2021 (CN) .......................... 202110721557.4

(51) Int. Cl.
*G06F 9/46* (2006.01)
*G06F 9/50* (2006.01)

(52) U.S. Cl.
CPC ...... *G06F 9/505* (2013.01); *G06F 2209/5022* (2013.01)

(58) Field of Classification Search
CPC .......................... G06F 9/505; G06F 2209/5022
See application file for complete search history.

(56) References Cited

U.S. PATENT DOCUMENTS

| | | | | |
|---|---|---|---|---|
| 2020/0133702 | A1* | 4/2020 | Sharma | G06F 9/5088 |
| 2021/0109830 | A1* | 4/2021 | Venugopal | H04L 67/10 |
| 2021/0168078 | A1* | 6/2021 | Ma | H04L 47/82 |

FOREIGN PATENT DOCUMENTS

| | | | | | |
|---|---|---|---|---|---|
| CN | 111198754 | A | * | 5/2020 | G06F 9/4881 |
| CN | 111694663 | A | * | 9/2020 | G06F 9/505 |

OTHER PUBLICATIONS

A. Gionis et al., "Clustering Aggregation," ACM Transactions on Knowledge Discovery from Data, vol. 1, No. 1, Article 4, Mar. 2007, 30 pages.

(Continued)

*Primary Examiner* — Diem K Cao
(74) *Attorney, Agent, or Firm* — Ryan, Mason & Lewis, LLP (57) ABSTRACT

The present disclosure relates to a method, a device, and a program product for managing a computing system. In a method, a current state and a plurality of historical states of a computing device in a computing system are acquired, the plurality of historical states respectively describing historical states of the computing device in the computing system at a plurality of historical time points. In response to determining that the current state matches a scheduling type for scheduling the computing device, the plurality of historical states are searched for a historical state matching the current state. A historical scheduling policy associated with the historical state is determined. Based on the historical scheduling policy, a computing task to be executed by the computing device is allocated to at least one other computing device in the computing system.

20 Claims, 8 Drawing Sheets

(56) References Cited

OTHER PUBLICATIONS

Wikipedia, "Consensus Clustering," https://en.wikipedia.org/wiki/Consensus_clustering, Nov. 12, 2020, 7 pages.
Wikipedia, "Hierarchical Clustering," https://en.wikipedia.org/wiki/Hierarchical_clustering, Oct. 7, 2020, 8 pages.
U.S. Appl. No. 17/101,052 filed in the name of Bin He et al. filed Nov. 23, 2020, and entitled "Method, Electronic Device, and Computer Program Product for Adjusting Computing Load."

* cited by examiner

| State | | | | | |
|---|---|---|---|---|---|
| Workload | Configuration information | Stored data | Connected users | Provided services | States of neighboring computing devices |

METHOD, DEVICE, AND PROGRAM PRODUCT FOR MANAGING COMPUTING SYSTEM

RELATED APPLICATION(S)

The present application claims priority to Chinese Patent Application No. 202110721557.4, filed Jun. 28, 2021, and entitled "Method, Device, and Program Product for Managing Computing System," which is incorporated by reference herein in its entirety.

FIELD

Implementations of the present disclosure relate to computing systems, and more particularly, to a method, a device, and a computer program product for managing computing tasks in a computing system.

BACKGROUND

With the development of mobile network technologies, higher and higher data transmission speeds can now be provided. Users can already acquire multiple types of services through mobile terminals. For example, users can acquire services of video, audio, various kinds of virtual reality, augmented reality, and mixed reality. It will be understood that when a mobile terminal is located at different positions in a mobile network, the quality of a mobile network signal received by the mobile terminal will be different. This will lead to phenomena such as delays and/or freezing of services at the mobile terminal. In this case, how to allocate computing tasks in a mobile network has become an important area of research.

SUMMARY

Illustrative embodiments disclosed herein provide a technical solution of allocating computing tasks in a mobile network in a more effective manner. This technical solution can be compatible with existing mobile networks, and by modifying various configurations of existing mobile networks, this technical solution can allocate computing tasks in a mobile network in a more effective manner.

According to a first aspect of the present disclosure, a method for managing a computing system is provided. In this method, a current state and a plurality of historical states of a computing device in the computing system are acquired, the plurality of historical states respectively describing historical states of the computing device in the computing system at a plurality of historical time points. In response to determining that the current state matches a scheduling type for scheduling the computing device, the plurality of historical states are searched for a historical state matching the current state. A historical scheduling policy associated with the historical state is determined. Based on the historical scheduling policy, a computing task to be executed by the computing device is allocated to at least one other computing device in the computing system.

According to a second aspect of the present disclosure, an electronic device is provided, including: at least one processor; and a memory coupled to the at least one processor, wherein the memory has instructions stored therein that, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically shows a block diagram of a computing system in which a method according to an example implementation of the present disclosure can be used according to a technical solution.

DETAILED DESCRIPTION

Illustrative embodiments of the present disclosure will be described in more detail below with reference to the accompanying drawings. Although illustrative embodiments of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or identical objects. Other explicit and implicit definitions may also be included below.

Figure 1:
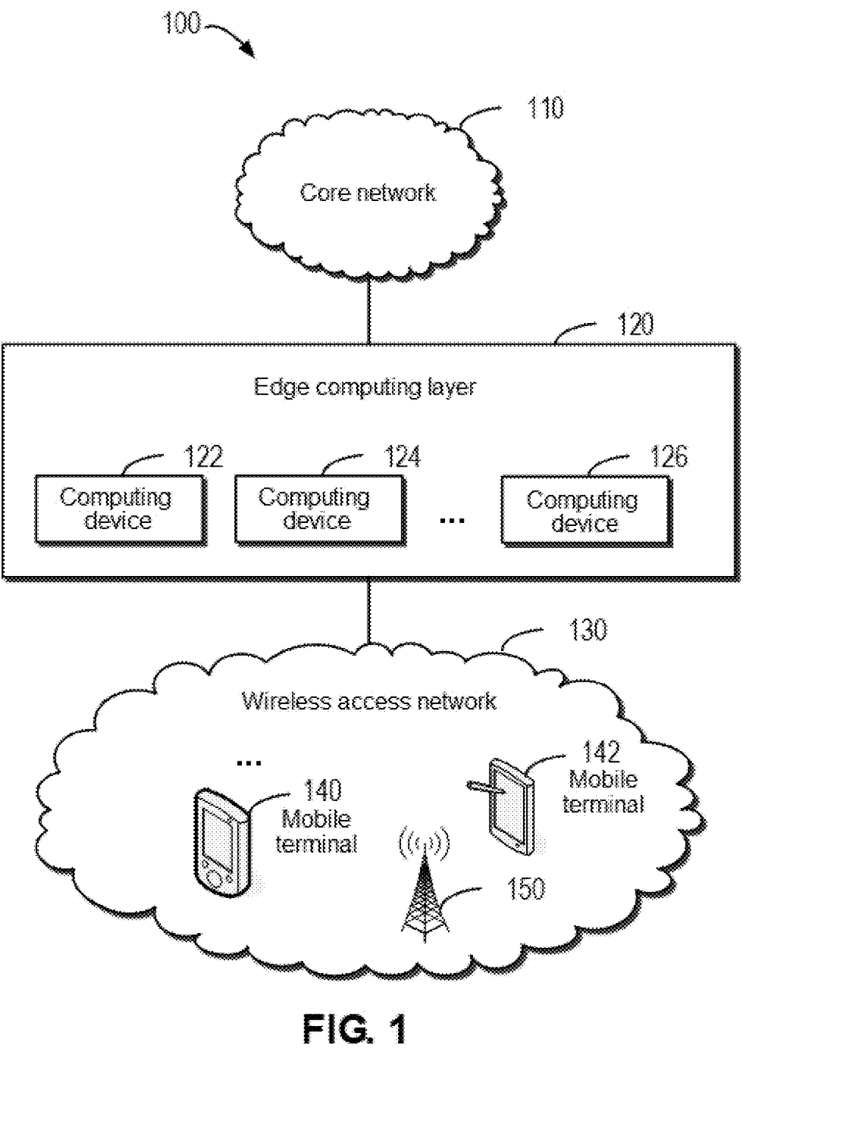

An application environment of an example implementation of the present disclosure will be first described with reference to FIG. 1. FIG. 1 schematically shows a block diagram of computing system 100 in which a method according to an example implementation of the present disclosure can be used according to a technical solution. Hereinafter, a mobile network environment will be used as an example of a computing system to describe various implementations of the present disclosure. As shown in FIG. 1, computing system 100 may include core network 110 and wireless access network 130. In wireless access network 130, mobile terminals 140, . . . , and 142 can communicate via base station 150. With the development of 5G technologies, an edge computing technology has been proposed at present. Edge computing layer 120 may be provided between core network 110 and wireless access network 130 of the mobile network. Edge computing layer 120 may include edge computing devices 122, 124, . . . , and 126, and so on. In this way, certain computing tasks can be migrated to edge computing layer 120 closer to the mobile terminals.

It will be understood that the workload of each computing device may change over time, which causes workloads of some computing devices to be too high, and thus it is difficult to provide services to the mobile terminals within an acceptable time. At present, a technical solution for dynamically scheduling computing tasks based on the workload of each computing device has been developed. For example, an association relationship between states of computing devices and scheduling policies for scheduling computing tasks may be determined based on a machine learning technology, and then a scheduling policy can be determined in real time based on the association relationship. However, the above technical solution requires a large quantity of training data and computing resources to perform training. Further, after the association relationship has been obtained, many computing resources are also needed to predict the corresponding scheduling policy. Since the computing resources of edge computing layer 120 are limited, it would be desirable to provide a simpler and more effective way to schedule computing tasks.

In order to solve the defects in existing technical solutions, an example implementation of the present disclosure provides a technical solution for managing a computing system. In this technical solution, a similar historical state can be selected based on a comparison between a current state and historical states of a computing device and according to a predetermined scheduling type, and a historical scheduling policy under the similar historical state can be used to execute allocation of computing tasks. In this way, the computation amount of edge computing layer 120 can be greatly reduced, and task scheduling can be performed in a faster and more effective manner.

Figure 2:
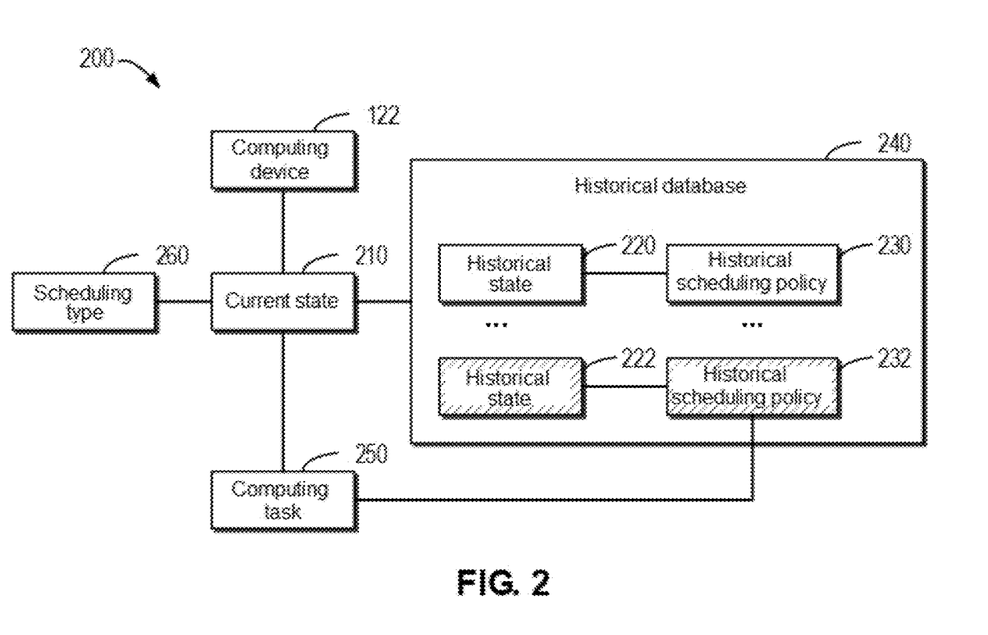
FIG. 2 schematically shows a block diagram for managing a computing system according to an example implementation of the present disclosure.

Hereinafter, an overview of an example implementation according to the present disclosure will be described with reference to FIG. 2. FIG. 2 schematically shows block diagram 200 for managing a computing system according to an example implementation of the present disclosure; As shown in FIG. 2, current state 210 of computing device 122 can be collected in real time, and a plurality of historical states 220, . . . , and 222 can be obtained from historical database 240. It can be determined whether current state 210 conforms to predetermined scheduling type 260, and if so, historical state 222 that matches current state 210 is identified from historical database 240. Further, historical scheduling policy 232 associated with historical state 222 may be determined. In this way, historical scheduling policy 232 suitable for current state 210 can be quickly identified with only a relatively small amount of computation, and the policy is used to schedule computing task 250 that otherwise would be executed by computing device 122.

According to an example implementation of the present disclosure, computing system 100 may include an edge network computing system, and computing device 122 may include an edge computing device in the edge network computing system. For ease of description, refer to Table 1 below to provide configuration information of computing device 122 in computing system 100.

TABLE 1

Configuration information of computing device

| Object | Attribute | Update frequency |
|---|---|---|
| Computing device 122 | Hardware server: Computing device (central processing unit), storage device, network device Hardware accelerator (GPU, coder-decoder, . . . ) | Every day |
| | Service RAN: Bandwidth, . . . | Every month |
| | Cluster of connected user devices: | High-speed user device: 1 second |
| | Location area Radio quality | Low-speed user device: 1 minute |
| | Stored data | Every hour |
| | Provided services | Every hour |
| | Computing tasks that are running: Service requirements Resource consumption Expected remainder | 1 minute |
| Neighboring computing devices (computing devices 124, . . . , and 126) | Neighboring addition type Geographic location Switching Load balancing | — |
| | Interaction frequency Unloading input/ output quantity Switching input/ output quantity Maximum mobility user device Maximum mobility service | Event-driven |
| | Edge information: the same as computing device 122 | — |
| Environment | Date and time Working day Whether this day is a special date | Every day or every hour |
| | Event or alarm | Time-driven |

It will be understood that Table 1 above only schematically shows an example of configuration information of computing device 122. According to an example implementation of the present disclosure, computing device 122 may have other configuration information. Specifically, the first column of Table 1 shows identifiers of objects, the second column shows attributes of related objects, and the third column shows the update frequency of each attribute. As shown in the second row of Table 1, the attributes of computing device 122 may include a plurality of attributes as shown in the second column of Table 1; as shown in the third row of Table 1, neighboring computing devices of computing device 122 include computing devices 124, . . . , and 126; the fourth row of Table 1 shows environmental information of computing device 122 and so on. It will be understood that the information shown in Table 1 can be updated with the operation of computing system 100, and thus the latest configuration information can be continuously obtained according to the update frequency shown in Table 1.

Figure 3:
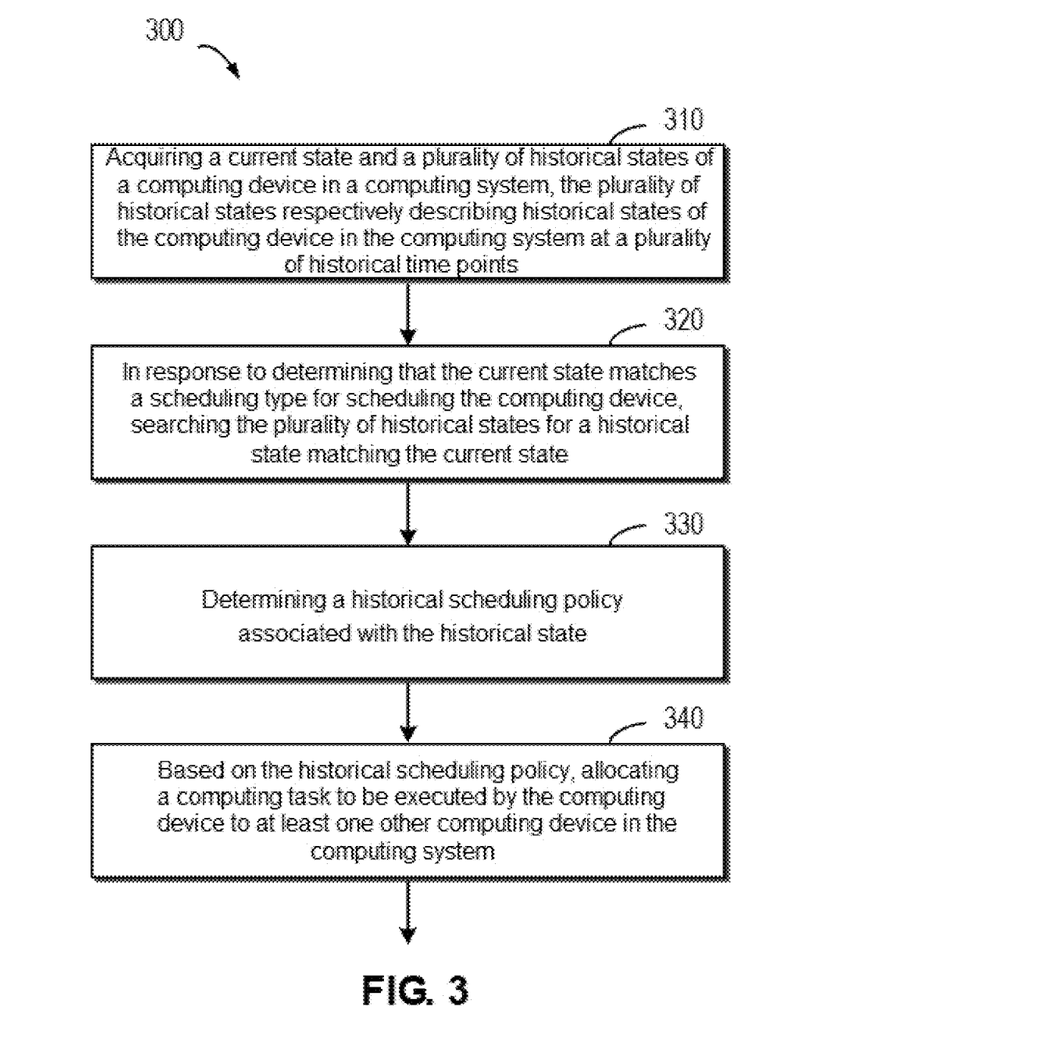
FIG. 3 schematically illustrates a flow chart of a method for managing a computing system according to an example implementation of the present disclosure.

Hereinafter, more details of an example implementation according to the present disclosure will be described with reference to FIG. 3. FIG. 3 schematically illustrates a flow chart of method 300 for managing computing system 100 according to an example implementation of the present disclosure. At block 310, current state 210 and a plurality of historical states 220, . . . , and 222 of computing device 122 in computing system 100 are acquired. Here, the plurality of historical states respectively describe historical states 220, . . . , and 222 of the computing device at a plurality of historical time points. It will be understood that the historical state herein may include the historical state of computing device 122. At this point, historical scheduling policies for scheduling computing device 122 at the historical time points can be stored, so that the identified historical scheduling policy can be more adapted to computing device 122. According to an example implementation of the present disclosure, the historical state may include historical states of other computing devices in computing system 100. In this way, historical knowledge for computing task scheduling can be utilized as fully as possible to serve future computing task scheduling.

According to an example implementation of the present disclosure, the state of each computing device can be determined based on a plurality of attributes of the computing device. Hereinafter, only computing device 122 is taken as an example to describe how to acquire current state 210. Specifically, a plurality of attributes of computing device 122 may be acquired, where the plurality of attributes may include at least any one of the following: a workload, configuration information, stored data, connected users, provided services, and states of neighboring computing devices of the computing device. More details about determining the state are described with reference to FIG. 4.

Figure 4:
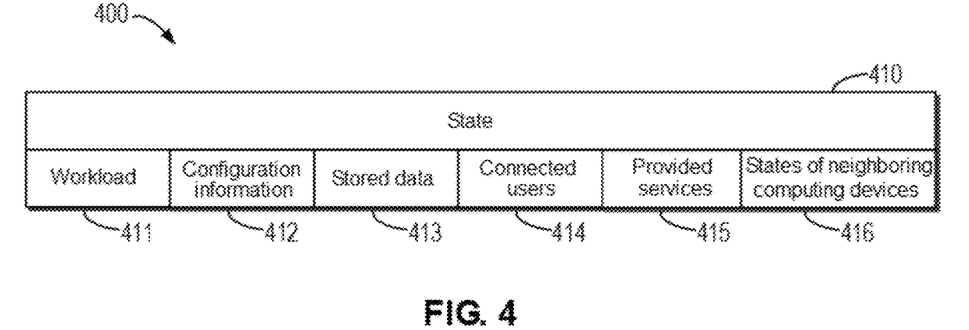
FIG. 4 schematically shows a block diagram of a state of a computing device according to an example implementation of the present disclosure.

FIG. 4 schematically shows block diagram 400 for a state of a computing device according to an example implementation of the present disclosure. As shown in FIG. 4, the fields in state 410 may be determined based on a plurality of attributes, respectively. The workload of each piece of hardware shown in Table 1 can be collected in real time. For example, workload 411 may represent a current workload of the central processing unit (and/or other hardware computing resources) of the computing device, and workload 411 may be expressed as a percentage. Configuration information 412 may represent a current system configuration of the computing device, stored data 413 may represent data stored in computing device 122 (e.g., related user data, etc.), connected users 414 may represent one or more currently connected users, provided services 415 may represent services that computing device 122 can provide (e.g., video services, virtual reality services, etc.), and states 416 of neighboring computing devices may include the states of neighboring computing devices around computing device 122. Specifically, related configuration information 412, stored data 413, connected users 414, provided services 415, and states 416 of neighboring computing devices can be acquired based on the above Table 1.

According to an example implementation of the present disclosure, current state 210 of computing device 122 may be determined based on the plurality of attributes shown in FIG. 4. For example, current state 210 of computing device 122 may be expressed in the form of a feature vector. Here, the feature vector may include the multiple fields shown in Table 1, and each field may be expressed in the form of a sub-vector, so as to describe the state of computing device 122 in various aspects. It will be understood that historical states may be stored in a similar manner. At this point, current state 210 and each of historical states 220, . . . , and 222 can be expressed in the form of feature vectors.

More details about searching the historical states will be described by returning to FIG. 3. At block 320 of FIG. 3, in response to determining that current state 210 matches scheduling type 260 for scheduling the computing device, the plurality of historical states are searched for historical state 222 that matches current state 210. It will be understood that scheduling type 260 herein may be selected from a plurality of predetermined types. Multiple scheduling types can be predefined: a reaction type, a prevention type, and a prediction type, and each scheduling type may have a predetermined threshold workload. When the workload of computing device 122 is higher than the threshold workload, the corresponding scheduling operation is triggered.

Specifically, the threshold workload of the reaction type is higher than that of the prevention type, and the threshold workload of the prevention type is higher than that of the prediction type. According to an example implementation of the present disclosure, the reaction type may relate to the highest threshold workload (e.g., 85% or other values). The reaction type indicates that computing device 122 has been overloaded at this time and computing task 250 should be unloaded to other computing devices. The prevention type may relate to a moderate threshold workload (e.g., 50% or other values). The prevention type indicates that, in order to prevent computing device 122 from being overloaded, computing task 250 should be unloaded to other computing devices. The prediction type may relate to the lowest threshold workload (e.g., 20% or other values). The prediction type may indicate that it is predicted that computing device 122 may be overloaded, so it is necessary to start a subsequent scheduling process to unload computing task 250 which otherwise would be performed by computing device 122 to other computing devices.

With the example implementation of the present disclosure, the same or different scheduling types 260 can be set for the computing devices to keep the workloads of the computing devices at a desired level. According to an example implementation of the present disclosure, scheduling type 260 may be set based on the type of service provided by the computing device and/or the type of users enjoying the service. Assuming that computing device 122 is used to provide real-time video services to VIP users, computing device 122 can be configured with prediction-type scheduling to ensure that computing device 122 can have sufficient resources to provide services to these VIP users at the highest response speed. Assuming that computing device 122 is used to provide non-real-time services to ordinary users, computing device 122 can be configured with reaction-type scheduling. When the state of computing device 122 is such that computing device 122 has difficulty meeting the response speed requirements, computing tasks related to the non-real-time services can be migrated to other computing devices with relatively low workloads.

According to an example implementation of the present disclosure, the plurality of historical states can be searched based on a comparison for historical state 222 matching current state 210. Specifically, the difference between current state 210 and each of the plurality of historical states may be determined, and a historical state whose difference satisfies a predetermined condition may be selected from the plurality of historical states. Specifically, the feature vector of current state 210 can be compared with the feature vector of each historical state, and the difference can be determined based on the distance (e.g., Euclidean distance) between the two feature vectors. For example, historical state 222 with the smallest difference may be selected.

According to an example implementation of the present disclosure, a predetermined threshold may be set and one or more historical states whose differences are below the predetermined threshold may be selected. In this way, the identified one or more historical states can provide more flexibility for the scheduling process. For example, more alternative scheduling policies can be provided when a historical scheduling policy associated with a certain historical state is not suitable for handling the current situation.

At block 330, historical scheduling policy 232 associated with historical state 222 may be determined. It will be understood that historical scheduling policy 232 here refers to the scheduling policy executed at the historical time point when historical state 222 is collected. Historical scheduling policy 232 is a scheduling policy that has been verified to be correct, and can be set by technical experts, determined based on machine learning techniques, or determined in other ways. With the example implementation of the present disclosure, a scheduling policy suitable for handling the current situation can be determined directly based on the historical experience of task scheduling that has been performed in the past. In this way, there is no need to perform complicated computing processes related to machine learning, only searching in historical database 240 is required, and then a suitable scheduling policy can be obtained.

At block 340, computing task 250 to be performed by computing device 122 may be allocated to at least one other computing device in computing system 100 based on historical scheduling policy 232. It will be understood that computing system 100 may include a plurality of other computing devices, and at this point, it is necessary to identify a suitable destination computing device from the plurality of other computing devices. Specifically, states of the plurality of other computing devices in computing system 100 can be acquired so as to select at least one other computing device from the plurality of other computing devices based on the states of the plurality of other computing devices. Hereinafter, more details will be described with reference to FIG. 5.

Figure 5:
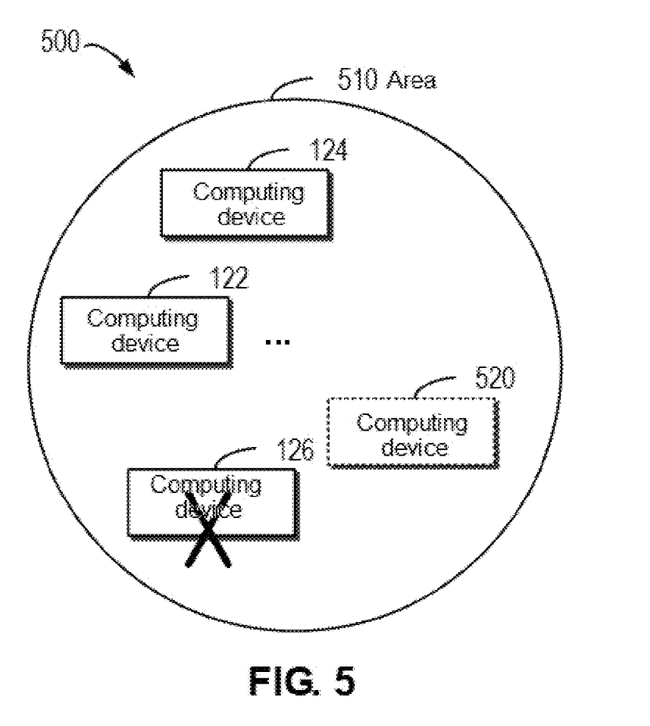
FIG. 5 schematically illustrates a block diagram of a distribution of computing devices according to an example implementation of the present disclosure.

FIG. 5 schematically illustrates a block diagram of distribution 500 of computing devices according to an example implementation of the present disclosure. As shown in FIG. 5, the state of each computing device may change over time. At the initial time point when computing system 100 is started, area 510 of computing system 100 may only include computing devices 122, 124, . . . , 126. With the operation of computing system 100, computing device 520 may be added to area 510, and computing device 126 may be removed from area 510. Therefore, it is possible to subscribe to update messages of the topological structure of computing system 100 in advance, so as to learn which neighboring computing devices exist near computing device 122 in a timely manner.

It will be understood that since the states of the computing devices may be abnormal, a heartbeat message can be continuously received from each computing device to determine whether the computing device is in a normal state. Assuming that the heartbeat message from a certain computing device has not been received for a long time (for example, more than 2 minutes or another length of time), the computing device can be marked as an "abnormal device." According to an example implementation of the present disclosure, states of peripheral computing devices can be updated in real time, so as to select a suitable destination from the peripheral computing devices.

It will be understood that although FIG. 5 shows only one area 510 of computing system 100, computing system 100 may include other more areas. Generally speaking, unloading computing tasks to computing devices located in different areas will involve complicated procedures and relatively large resource overhead. Therefore, in the context of the present disclosure, only an example of unloading computing tasks to other computing devices inside area 510 is shown.

Figure 6:
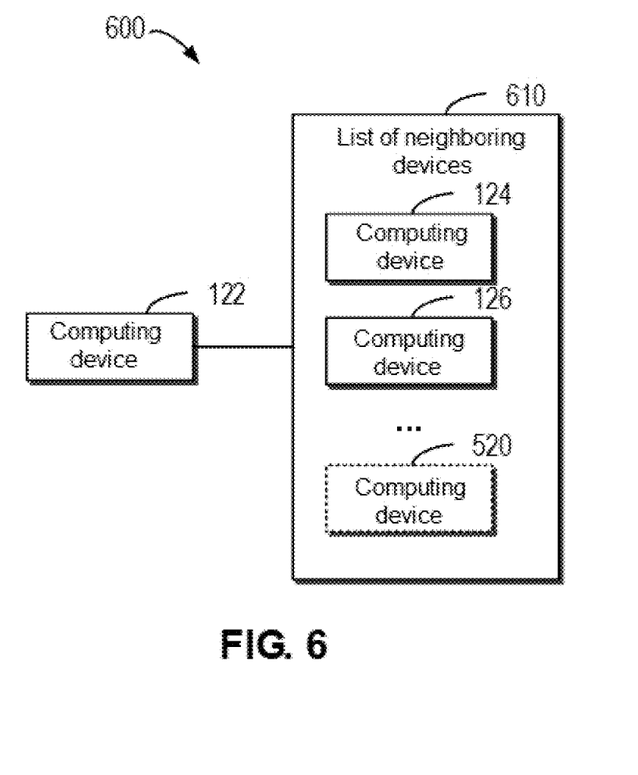
FIG. 6 schematically shows a block diagram of a list of neighboring computing devices of a computing device according to an example implementation of the present disclosure.

According to an example implementation of the present disclosure, a list of neighboring devices may be maintained for each computing device. Hereinafter, more details will be described with reference to FIG. 6. FIG. 6 schematically shows block diagram 600 of a list of neighboring computing devices of a computing device according to an example implementation of the present disclosure. As shown in FIG. 6, neighboring device list 610 may be provided for computing device 122, and neighboring device list 610 may include one or more computing devices around computing device 122 that may be used as an unloading destination. It will be understood that "neighboring" here is a logical concept, not a physical distance between two computing devices. For example, the logical distance between two devices can be determined based on the number of "hops" between the two devices. For another example, the logical distance can be determined based on the bandwidth or response time between two devices.

With the operation of the computing system, neighboring device list 610 can be continuously updated. For example, when the network topology changes and computing device 520 is added to area 510, computing device 520 is added to neighboring device list 610. For another example, assuming that the heartbeat message from computing device 126 has not been received for a long time, computing device 126 may be deleted from neighboring device list 610. Further, the logical distance between computing device 122 and each neighboring computing device can be acquired according to a predetermined time interval, so that computing devices that do not meet requirements can be deleted from neighboring device list 610.

According to an example implementation of the present disclosure, computing task 250 may be allocated based on identified historical scheduling policy 232. It is assumed that historical scheduling policy 232 defines that: computing task 250 is unloaded to computing device 124, and at this point, it can be checked whether computing device 124 exists in neighboring device list 610. If the checking result is "Yes," computing task 250 may be allocated to computing device 124. If the checking result is "No," neighboring device list 610 may be searched for a computing device with a state similar to (or having higher performance than) that of computing device 124. Further, computing task 250 may be allocated to the identified computing device. For example, based on the type of computing task 250, a computing device matching the type can be selected as a destination. Assuming that computing task 250 involves a large amount of computation, a computing device with sufficient computing resources can be selected; assuming that computing task 250 involves a large amount of data, a computing device with a relatively high bandwidth can be selected. According to an example implementation of the present disclosure, neighboring device list 610 can be searched for a computing device with relatively high overall performance.

Figure 7:
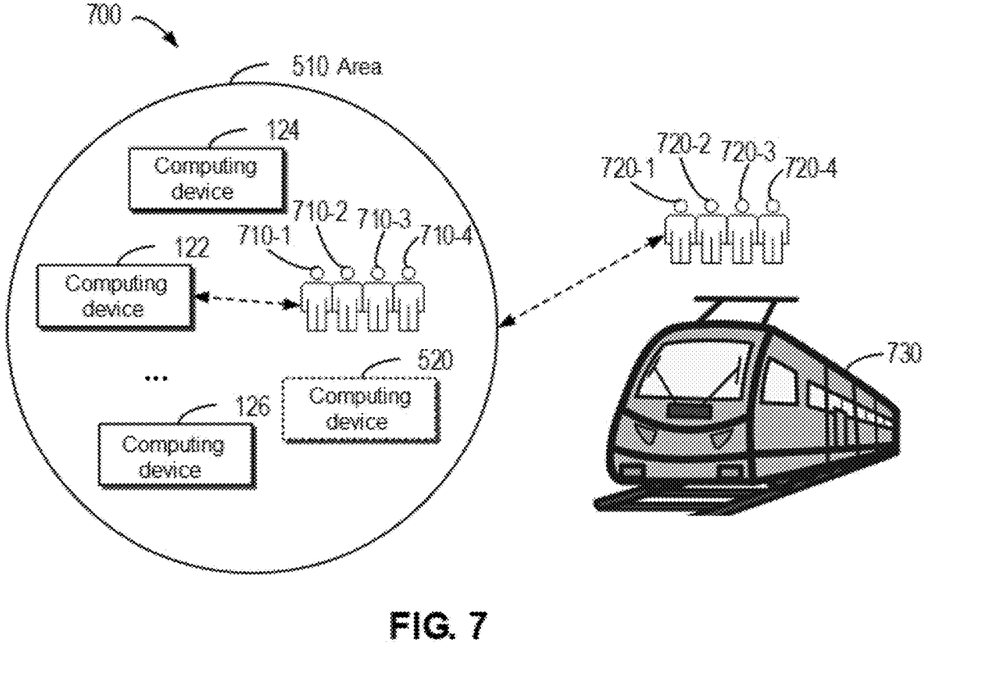
FIG. 7 schematically shows a block diagram for allocating computing tasks according to an example implementation of the present disclosure.

According to an example implementation of the present disclosure, more details about computing resource scheduling are described with reference to FIG. 7. FIG. 7 schematically shows block diagram 700 for allocating computing tasks according to an example implementation of the present disclosure. As shown in FIG. 7, multiple user devices 710-1, 710-2, 710-3, . . . , 710-4 (collectively referred to as user device 710) in area 510 are connected to computing device 122, and receive services provided by computing device 122. At this point, a large number of users who take train 730 can carry their respective user devices 720-1, 720-2, 720-3, . . . , 720-4 (collectively referred to as user device 720). When train 730 gradually approaches area 510, user device 720 will switch to computing devices 122, 124, 126, . . . , 520 in area 510.

According to an example implementation of the present disclosure, current state 210 of computing device 122 may be collected in advance, and historical state 222 similar to current state 210 may be retrieved, and then corresponding historical scheduling policy 232 may be identified. It is assumed that historical scheduling policy 232 represents that: due to the arrival of train 730, a large number of user devices 720 will be connected to computing device 122, some computing tasks 250 of computing device 122 need to be unloaded to computing devices 124 and 126 in advance.

At this point, part and/or all of computing tasks associated with user device 710 may be migrated to computing devices 124 and 126 based on historical scheduling policy 232. Assuming that both computing devices 124 and 126 are in a low load state at this point and can be used as a migration destination, computing tasks associated with user devices 710-1 and 710-2 can be migrated to computing device 124 and computing tasks associated with user devices 710-3 and 710-4 can be migrated to computing device 126 based on historical scheduling policy 232.

It will be understood that although FIG. 7 shows an example of migrating computing tasks to computing devices 124 and 126, according to an example implementation of the present disclosure, computing tasks may be migrated to other destinations according to historical scheduling policies. According to an example implementation of the present disclosure, an appropriate scheduling type can be selected from a reaction type, a prevention type, and a prediction type based on the service provided by computing device 122 and the user type. Assuming that computing device 122 mainly provides services to VIP users, the prediction type can be selected. In this way, it can be ensured that sufficient resources are reserved for VIP users before a large number of user devices 720 actually enter area 510. According to an example implementation of the present disclosure, a scheduling policy of a reaction type may be selected for computing device 122. At this point, when an overloading state has been detected, the typical reactive unloading policy can be used for load balancing.

According to an example implementation of the present disclosure, after the above load balancing operation, the workload of each computing device will change. When a large number of user devices 720 enter area 510, selecting which computing device can be determined based on the real-time workload of each computing device. According to an example implementation of the present disclosure, computing device 124 can be designated to provide services only for VIP users, and at this point, among a large number of user devices 720, only user devices having the VIP permission can be connected to computing device 124. In this way, sufficient resources can be reserved for VIP users.

It will be understood that since various resources of computing devices in edge computing layer 120 are limited, conventional machine learning-based unloading methods will further increase the workload of each computing device. With the example implementation of the present disclosure, by recording historical workloads of computing devices and related historical scheduling policies, scheduling policies to be executed in the future can be determined in a simpler and more effective manner.

In the example shown in FIG. 7 above, assuming that historical data shows that train 730 arrives at area 510 at 10:00 every day, and part of computing tasks of computing device 122 is unloaded to other computing devices at 09:50 every day. At this point, matching historical scheduling policy 232 can be identified from the historical database in advance, and the unloading process can be performed in advance. Assuming that the predictive-type scheduling is adopted, when the workload of computing device 122 reaches 20%, a large number of user devices 720 have not yet entered area 510 but there is already a trend of rapid increase in workload. At this point, the unloading process can be triggered in advance to ensure the experience of VIP users. Further, as a large number of user devices 720 enter area 510, the workload of computing device 122 further increases, and at this point, the prevention-type computing resource scheduling and reaction-type computing resource scheduling can be triggered successively.

With the example implementation of the present disclosure, by analyzing the current state of each computing device and searching historical database 240, a suitable scheduling policy can be obtained without a large amount of computing resources. In this way, the demand for computing resources can be greatly reduced, and the load balancing of computing devices in edge computing layer 120 can be achieved.

According to an example implementation of the present disclosure, if there is no historical state matching current state 210 among the plurality of historical states, it means that there has never been a situation similar to the current state in history. At this point, a machine learning algorithm can be further invoked to predict a scheduling policy to be executed. Specifically, an allocation model describing the association relationship between states of a computing device and scheduling policies can be obtained. It will be understood that the allocation model here may be an allocation model obtained based on training algorithms that have been developed at present and/or will be developed in the future. The allocation model can describe the relationship between states of the computing device and scheduling policies. In other words, the allocation model records the long-term accumulated historical experience of selecting a scheduling policy, and a suitable scheduling policy can be identified based on the historical experience.

Specifically, current state 210 of computing device 122 can be input to the allocation model, and the allocation model will output a scheduling policy that matches current state 210. Then, based on the output scheduling policy, computing tasks can be allocated to other computing devices in computing system 100. Further, current state 210 and the output scheduling policy can be used to update historical database 240. In this way, the content of historical database 240 can be continuously enriched to serve future computing task scheduling.

With the example implementation of the present disclosure, when a similar historical condition (e.g., historical state 220) is directly identified from historical database 240, the corresponding scheduling policy (e.g., historical scheduling policy 230) can be quickly provided. Further, when historical database 240 does not include a similar historical condition, a feasible scheduling policy can be predicted based on a machine learning process. Although the prediction process may involve a large amount of computation and a long time at this point, with the continuous enrichment of historical database 240, the frequency of invoking a machine learning process will gradually decrease. At this point, the scheduling policy can be determined in a simpler and faster way. It will be understood that although computing device 122 is used as an example above to describe the process for scheduling computing task 250, method 300 described above may be performed at multiple other computing devices. For example, method 300 may be periodically executed at various computing devices.

Examples of the method according to the present disclosure have been described in detail above with reference to FIGS. 2 to 7, and implementations of a corresponding apparatus will be described below. According to an example implementation of the present disclosure, an apparatus for managing a computer system is provided. This apparatus includes: an acquiring module configured to acquire a current state and a plurality of historical states of a computing device in the computing system, the plurality of historical states respectively describing historical states of the computing device in the computing system at a plurality of historical time points; a searching module configured to search, in response to determining that the current state matches a scheduling type for scheduling the computing device, the plurality of historical states for a historical state matching the current state; a determining module configured to determine a historical scheduling policy associated with the historical state; and a allocating module configured to allocate, based on the historical scheduling policy, a computing task to be executed by the computing device to at least one other computing device in the computing system. According to an example implementation of the present disclosure, this apparatus further includes modules for performing other steps in method 300 described above.

Figure 8:
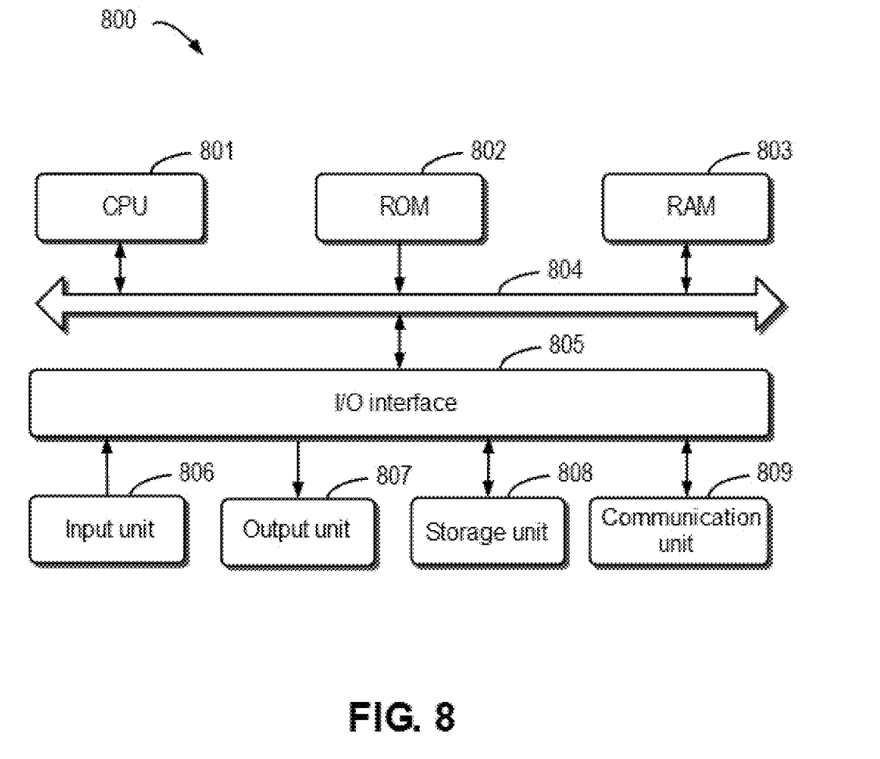
FIG. 8 schematically illustrates a block diagram of a device for managing a computing system according to an example implementation of the present disclosure.

FIG. 8 schematically illustrates a block diagram of device 800 for managing a computing system according to an example implementation of the present disclosure. As shown in the figure, device 800 includes central processing unit (CPU) 801 that may execute various appropriate actions and processing according to computer program instructions stored in read-only memory (ROM) 802 or computer program instructions loaded from storage unit 808 into random access memory (RAM) 803. Various programs and data required for operations of device 800 may further be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices over a computer network such as the Internet and/or various telecommunication networks.

The various processes and processing described above, such as method 300, may be performed by CPU 801. For example, in some implementations, method 300 may be implemented as a computer software program that is tangibly included in a machine-readable medium, such as storage unit 808. In some implementations, part or all of the computer program may be loaded and/or installed on device 800 via ROM 802 and/or communication unit 809. When the computer program is loaded into RAM 803 and executed by CPU 801, one or more steps of method 300 described above may be performed. Alternatively, in other implementations, CPU 801 may also be configured in any other suitable manner to implement the above-described process/method.

According to an example implementation of the present disclosure, an electronic device is provided, including: at least one processor; and a memory coupled to the at least one processor, wherein the memory has instructions stored therein that, when executed by the at least one processor, cause the device to perform a method for managing a computing system. This method includes: acquiring a current state and a plurality of historical states of a computing device in the computing system, the plurality of historical states respectively describing historical states of the computing device in the computing system at a plurality of historical time points; in response to determining that the current state matches a scheduling type for scheduling the computing device, searching the plurality of historical states for a historical state matching the current state; determining a historical scheduling policy associated with the historical state; and based on the historical scheduling policy, allocating a computing task to be executed by the computing device to at least one other computing device in the computing system.

According to an example implementation of the present disclosure, determining the current state of the computing device includes: acquiring a plurality of attributes of the computing device, the plurality of attributes comprising at least any one of the following: the workload, configuration information, stored data, connected users, provided services, and states of neighboring computing devices of the computing device; and determining the current state based on the plurality of attributes.

According to an example implementation of the present disclosure, searching the plurality of historical states for the historical state matching the current state includes: in response to determining that a difference between the current state and a historical state among the plurality of historical states satisfies a predetermined condition, selecting the historical state.

According to an example implementation of the present disclosure, allocating the computing task to the at least one other computing device includes: acquiring states of a plurality of other computing devices in the computing system; and selecting the at least one other computing device from the plurality of other computing devices based on the states of the plurality of other computing devices.

According to an example implementation of the present disclosure, the method further includes determining the plurality of other computing devices in response to at least any one of the following: an update message of the topological structure of the computing system; and heartbeat messages from the plurality of other computing devices.

According to an example implementation of the present disclosure, the method further includes: updating the at least one other computing device based on the states of the plurality of other computing devices.

According to an example implementation of the present disclosure, allocating the computing task to the at least one other computing device includes: allocating the computing task to the at least one other computing device in response to determining that the at least one other computing device exists.

According to an example implementation of the present disclosure, the method further includes: in response to determining that there is no historical state matching the current state among the plurality of historical states and based on the current state and an allocation model describing an association relationship between states of the computing device and scheduling policies, determining a scheduling policy corresponding to the current state; and based on the scheduling policy, allocating a computing task to another computing device in the computing system.

According to an example implementation of the present disclosure, the computing system includes an edge network computing system, and the computing device includes an edge computing device in the edge network computing system.

According to an example implementation of the present disclosure, the scheduling type includes at least any one of the following: a reaction type, a prevention type, and a prediction type, wherein the threshold workload of the reaction type is higher than that of the prevention type, and the threshold workload of the prevention type is higher than that of the prediction type.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions that, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiberoptic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of the blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, and to otherwise enable persons of ordinary skill in the art to understand the implementations disclosed here.

What is claimed is:

1. A method for managing a computing system, comprising:
    acquiring a current state and a plurality of historical states of a computing device in the computing system, the plurality of historical states respectively describing historical states of the computing device in the computing system at a plurality of historical time points;
    in response to determining that the current state matches a scheduling type for scheduling the computing device, searching the plurality of historical states for a historical state matching the current state;
    in response to at least one historical state matching the current state, determining a historical scheduling policy associated with the historical state; and
    based on the historical scheduling policy, allocating a computing task to be executed by the computing device to at least one other computing device in the computing system, the at least one other computing device being selected for allocation of the computing task based on at least one respective state of the at least one other computing device.

2. The method according to claim 1, wherein acquiring the current state of the computing device comprises:
    acquiring a plurality of attributes of the computing device, the plurality of attributes comprising at least any one of the following: a workload, configuration information, stored data, connected users, provided services, and states of neighboring computing devices of the computing device; and
    determining the current state based on the plurality of attributes.

3. The method according to claim 1, wherein searching the plurality of historical states for the historical state matching the current state comprises: in response to determining that a difference between the current state and a historical state among the plurality of historical states satisfies a predetermined condition, selecting the historical state.

4. The method according to claim 1, wherein allocating the computing task to the at least one other computing device comprises:
    acquiring states of a plurality of other computing devices in the computing system; and
    selecting the at least one other computing device from the plurality of other computing devices based on the states of the plurality of other computing devices.

5. The method according to claim 4, further comprising determining the plurality of other computing devices in response to at least any one of the following:
    an update message of a topological structure of the computing system; and
    heartbeat messages from the plurality of other computing devices.

6. The method according to claim 5, further comprising: updating the at least one other computing device based on the states of the plurality of other computing devices.

7. The method according to claim 4, wherein allocating the computing task to the at least one other computing device comprises: allocating the computing task to the at least one other computing device in response to determining that the at least one other computing device exists.

8. The method according to claim 1, further comprising:
    in response to no historical state matching the current state among the plurality of historical states and based on the current state and an allocation model describing an association relationship between states of the computing device and scheduling policies, determining a scheduling policy corresponding to the current state; and
    allocating the computing task to other computing devices in the computing system based on the scheduling policy.

9. The method according to claim 1, wherein the computing system comprises an edge network computing system, and the computing device comprises an edge computing device in the edge network computing system.

10. The method according to claim 1, wherein the scheduling type comprises at least any one of the following: a reaction type, a prevention type, and a prediction type, wherein a threshold workload of the reaction type is higher than a threshold workload of the prevention type, and the threshold workload of the prevention type is higher than a threshold workload of the prediction type.

11. An electronic device, comprising:
    at least one processor; and
    a memory coupled to the at least one processor, wherein the memory has instructions stored therein that, when executed by the at least one processor, cause the electronic device to perform a method for managing a computing system, the method including:
    acquiring a current state and a plurality of historical states of a computing device in the computing system, the plurality of historical states respectively describing historical states of the computing device in the computing system at a plurality of historical time points;

in response to determining that the current state matches a scheduling type for scheduling the computing device, searching the plurality of historical states for a historical state matching the current state;

in response to at least one historical state matching the current state, determining a historical scheduling policy associated with the historical state; and based on the historical scheduling policy, allocating a computing task to be executed by the computing device to at least one other computing device in the computing system, the at least one other computing device being selected for allocation of the computing task based on at least one respective state of the at least one other computing device.

12. The electronic device according to claim 11, wherein acquiring the current state of the computing device comprises:

acquiring a plurality of attributes of the computing device, the plurality of attributes comprising at least any one of the following: a workload, configuration information, stored data, connected users, provided services, and states of neighboring computing devices of the computing device; and determining the current state based on the plurality of attributes.

13. The electronic device according to claim 11, wherein searching the plurality of historical states for the historical state matching the current state comprises: in response to determining that a difference between the current state and a historical state among the plurality of historical states satisfies a predetermined condition, selecting the historical state.

14. The electronic device according to claim 11, wherein allocating the computing task to the at least one other computing device comprises:

acquiring states of a plurality of other computing devices in the computing system; and selecting the at least one other computing device from the plurality of other computing devices based on the states of the plurality of other computing devices.

15. The electronic device according to claim 14, wherein the method further comprises determining the plurality of other computing devices in response to at least any one of the following:

an update message of a topological structure of the computing system; and heartbeat messages from the plurality of other computing devices.

16. The electronic device according to claim 15, wherein the method further comprises: updating the at least one other computing device based on the states of the plurality of other computing devices.

17. The electronic device according to claim 14, wherein allocating the computing task to the at least one other computing device comprises: allocating the computing task to the at least one other computing device in response to determining that the at least one other computing device exists.

18. The electronic device according to claim 11, wherein the method further comprises:

in response to no historical state matching the current state among the plurality of historical states and based on the current state and an allocation model describing an association relationship between states of the computing device and scheduling policies, determining a scheduling policy corresponding to the current state; and allocating the computing task to other computing devices in the computing system based on the scheduling policy.

19. The electronic device according to claim 11, wherein the computing system comprises an edge network computing system, and the computing device comprises an edge computing device in the edge network computing system; and the scheduling type comprises at least any one of the following: a reaction type, a prevention type, and a prediction type, wherein a threshold workload of the reaction type is higher than a threshold workload of the prevention type, and the threshold workload of the prevention type is higher than a threshold workload of the prediction type.

20. A computer program product tangibly stored on a non-transitory computer-readable medium and comprising machine-executable instructions, wherein the machine-executable instructions are used to perform a method for managing a computing system, the method comprising:

acquiring a current state and a plurality of historical states of a computing device in the computing system, the plurality of historical states respectively describing historical states of the computing device in the computing system at a plurality of historical time points;

in response to determining that the current state matches a scheduling type for scheduling the computing device, searching the plurality of historical states for a historical state matching the current state;

in response to at least one historical state matching the current state, determining a historical scheduling policy associated with the historical state; and based on the historical scheduling policy, allocating a computing task to be executed by the computing device to at least one other computing device in the computing system, the at least one other computing device being selected for allocation of the computing task based on at least one respective state of the at least one other computing device.

* * * * *